(12) United States Patent
Matsui

(10) Patent No.: US 9,510,003 B2
(45) Date of Patent: Nov. 29, 2016

(54) MOVING PICTURE CODING DEVICE, MOVING PICTURE CODING METHOD, AND MOVING PICTURE CODING PROGRAM

(75) Inventor: Koji Matsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 664 days.

(21) Appl. No.: 13/036,871

(22) Filed: Feb. 28, 2011

(65) Prior Publication Data

US 2011/0274160 A1    Nov. 10, 2011

(30) Foreign Application Priority Data

May 10, 2010   (JP) .................................. 2010-107841

(51) Int. Cl.
| | |
|---|---|
| *H04N 7/12* | (2006.01) |
| *H04N 7/36* | (2006.01) |
| *H04N 11/02* | (2006.01) |
| *H04N 19/152* | (2014.01) |
| *H04N 19/176* | (2014.01) |
| *H04N 19/61* | (2014.01) |
| *H04N 19/126* | (2014.01) |
| *H04N 19/146* | (2014.01) |
| *H04N 19/124* | (2014.01) |

(52) U.S. Cl.
CPC .......... *H04N 19/152* (2014.11); *H04N 19/124* (2014.11); *H04N 19/176* (2014.11); *H04N 19/61* (2014.11); *H04N 7/26079* (2013.01); *H04N 7/26085* (2013.01); *H04N 7/26164* (2013.01); *H04N 7/26244* (2013.01); *H04N 7/50* (2013.01)

(58) Field of Classification Search
CPC .............. H04N 7/50; H04N 7/26244; H04N 7/26085; H04N 7/26079; H04N 7/26164

USPC ............. 375/240.02, 240.03, 240.25, 240.26
See application file for complete search history.

(56) References Cited

U.S. PATENT DOCUMENTS

| | | | | |
|---|---|---|---|---|
| 5,650,860 | A | * | 7/1997 | Uz ................................ 382/253 |
| 6,044,115 | A | * | 3/2000 | Horiike et al. .......... 375/240.05 |
| 6,347,117 | B1 | * | 2/2002 | Kato ................ H04N 21/23406 |
| | | | | 375/240.05 |
| 6,408,027 | B2 | * | 6/2002 | Mori et al. ............... 375/240.05 |
| 6,937,770 | B1 | * | 8/2005 | Oguz et al. .................... 382/235 |
| 2002/0034246 | A1 | * | 3/2002 | Yamada et al. .......... 375/240.03 |
| 2002/0044603 | A1 | * | 4/2002 | Rajagopalan et al. ... 375/240.03 |
| 2004/0125876 | A1 | * | 7/2004 | Kodama et al. ......... 375/240.16 |
| 2004/0213346 | A1 | * | 10/2004 | Matsumura et al. .... 375/240.03 |
| 2005/0002454 | A1 | * | 1/2005 | Ueno et al. .............. 375/240.03 |

(Continued)

FOREIGN PATENT DOCUMENTS

| | | |
|---|---|---|
| JP | 05-260455 | 10/1993 |
| JP | 11-069344 | 3/1999 |
| JP | 2004-328150 | 11/2004 |
| JP | 2006-295535 | 10/2006 |

(Continued)

*Primary Examiner* — Tat Chio
*Assistant Examiner* — On S Mung
(74) *Attorney, Agent, or Firm* — Wenderoth, Lind & Ponack, L.L.P.

(57) ABSTRACT

A moving picture coding device is a moving picture coding device which codes a moving picture, and includes: a VBV modeling unit which simulates an occupancy amount of a coded data buffer (VBV buffer occupancy amount) at the time of decoding; and a bit rate control unit which determines a quantization width (quantization scale) according to a rate of change of the occupancy amount of the coded data buffer so that the occupancy amount of the coded data buffer increases.

6 Claims, 5 Drawing Sheets

(56) References Cited

U.S. PATENT DOCUMENTS

2005/0254574 A1* 11/2005 Himeno et al. .......... 375/240.01
2005/0254578 A1* 11/2005 Muthukrinan et al. .. 375/240.03

FOREIGN PATENT DOCUMENTS

| JP | 2006-319868 | 11/2006 |
| JP | 2007-174170 | 7/2007 |

* cited by examiner

MOVING PICTURE CODING DEVICE, MOVING PICTURE CODING METHOD, AND MOVING PICTURE CODING PROGRAM

BACKGROUND OF THE INVENTION (1) Field of the Invention

The present invention relates to a moving picture coding device, a moving picture coding method, and a moving picture coding program in which a coded data buffer is used.

(2) Description of the Related Art

In recent years, the MPEG format or H.264 format has been known as a moving picture coding format used in accumulating or transmitting of a digital video, and compatibility between decoding devices has been ensured by defining operations of a coded data buffer (e.g., a Video Buffer Verifier (VBV) buffer according to the MPEG-2 standard, and a Coded Picture Buffer (CPB) according to the H.264 standard) in a decoding device.

Such a moving picture coding format is required to generate a bit stream based on the definition so that the coded data buffer of the decoding device does not fail.

Examples of the failure of the coded data buffer include underflow (buffer underflow) and overflow (buffer overflow). The buffer underflow means that an amount of a coded picture becomes excessive, and that a buffer occupancy amount of the coded data buffer of the decoding device becomes zero. The buffer overflow means that the amount of the coded picture becomes insufficient, and that the buffer occupancy amount exceeds the maximum amount of the coded data buffer.

A conventional coding device includes a buffer model (virtual buffer model) which simulates an occupancy amount of a coded data buffer of a decoding device so that the above failure of the coded data buffer is not caused. The conventional coding device assures conformity of the coded data buffer by controlling an amount of a coded picture through reflection of a result of the buffer model in a bit rate control.

This type of the conventional moving picture coding device is described with reference to FIG. 5. FIG. 5 is a block diagram showing a structure of the conventional moving picture coding device according to the MPEG-2 standard.

As shown in FIG. 5, the conventional moving picture coding device 100 includes a DCT unit 101, a quantization unit 102, a coding unit 103, a VBV modeling unit 104, and a bit rate control unit 105.

The DCT unit 101 performs an orthogonal transformation on an input image 111, and outputs a DCT coefficient 112. The quantization unit 102 quantizes the DCT coefficient 112 based on a quantization scale 117 obtained from the bit rate control unit 105, and outputs a quantization coefficient 113. The coding unit 103 performs source coding on the quantization coefficient 113 and additional information such as the quantization scale 117, and outputs a bit stream 114.

The VBV modeling unit 104 simulates a VBV buffer, which is a coded data buffer according to the MPEG-2 format, based on an amount of coded data 115, which is generated by the coding unit 103, and outputs a buffer occupancy amount (VBV buffer occupancy amount 116) to the bit rate control unit 105.

The MPEG-2 standard does not define a method of controlling an amount of coded data for the bit stream 114. In order to regulate a bit stream to have a desired amount of coded data, the bit rate control unit 105 generally determines the quantization scale 117 based on the amount of coded data and the buffer occupancy amount (VBV buffer occupancy amount 116) so that the coded data buffer does not fail.

Further, Patent Reference 1 (Japanese Unexamined Patent Application Publication No. 2006-295535) discloses a technique for coding for stable picture quality while limiting underflow of a VBV buffer. In the moving picture coding device disclosed in Patent Reference 1, the bit rate control unit 105 calculates a first quantization scale for minimizing an error between an amount of coded data generated so far and a target bit rate, and a second quantization scale for avoiding the underflow. The second quantization scale is determined so that an amount of coded data falls below an amount of coded data available until after the next reference picture is coded. The bit rate control unit 105 selects, as the quantization scale 117, larger one of the first and second quantization scales, and outputs the quantization scale 117 to the quantization unit 102.

As stated above, the conventional moving picture coding device operates so as not to cause the buffer underflow or the buffer overflow.

In order to avoid the buffer underflow, it is necessary to limit the amount of the data coded by the coding unit so that the amount of the coded data does not exceed the buffer occupancy amount. More specifically, examples of the method for avoiding the buffer underflow include a method for reducing a quantization coefficient by increasing a quantization scale based on a buffer occupancy amount, and a method for skipping coding with a DCT coefficient to skip a quantization coefficient.

However, the conventional moving picture coding device determines the quantization scale right before the coded data buffer fails so that the coded data buffer does not fail, and thus there is a problem that picture quality deteriorates. Moreover, reducing or skipping the quantization coefficient causes the above problem.

The moving picture coding device disclosed in Patent Reference 1 reduces the amount of the coded data using larger one of the two quantization scales, and avoids the buffer underflow. However, with the structure of Patent Reference 1, there is a problem that a discontinuous change of quality between pictures impairs subjective picture quality before and after the selection of the larger one of the quantization scales is switched. In particular, with the structure of Patent Reference 1, the first and second quantization scales are determined independently of each other, and thus there is a case where a control amount for increasing the amount of the coded data by the first quantization scale coexists with a control amount for decreasing the amount of the coded data by the second quantization scale. A conflict between the control amounts tends to cause a discontinuous picture quality difference between the pictures.

Furthermore, in Patent Reference 1, even in the case of an input image which causes gradual decrease of the coded data buffer, the first quantization scale is selected, because the buffer underflow is not initially caused. When the above situation continues and the buffer occupancy amount falls below the above available amount of the coded data, the second quantization scale significantly increases in an attempt to avoid the buffer underflow. Consequently, there is also a problem that a sudden change of a quantization scale by selecting the second quantization scale as the maximum value causes the discontinuous picture quality difference.

As stated above, although the conventional moving picture coding device attempts to avoid the buffer underflow by changing the quantization scale according to the buffer occupancy amount, there is the problem that the change of the discontinuous picture quality deteriorates the subjective picture quality.

It is to be noted that although there is a method for increasing an amount of a coded picture by decreasing a quantization scale, adding invalid data by a coding unit, and so on, in order to avoid the buffer overflow, the decrease in the quantization scale enhances the picture quality, and the invalid data does not contribute to enhance the picture quality, because the invalid data is coded data irrelevant to a picture signal. Further, in general variable bit rate (VBR) coding, a bit rate at which a bit stream is provided to a coded data buffer can be reduced or the provision of the bit stream can be suspended, and thus it is possible to avoid the overflow without adding the invalid data. As stated above, the operation for avoiding the buffer overflow does not cause the picture quality to deteriorate.

SUMMARY OF THE INVENTION

The present invention has been devised to solve the above problems, and has an object to provide a moving picture coding device and a moving picture coding method which make it possible to prevent a coded data buffer from failing without deteriorating subjective picture quality.

In order to solve the problems, a moving picture coding device according to an aspect of the present invention is a moving picture coding device which codes a moving picture, and includes a buffer modeling unit configured to simulate an occupancy amount of a coded data buffer at the time of decoding; and a bit rate control unit configured to determine a quantization width according to a rate of change of the occupancy amount of the coded data buffer.

The present invention makes it possible to prevent the coded data buffer from failing without deteriorating the subjective picture quality, and to generate a bit stream in conformity to a standard.

FURTHER INFORMATION ABOUT TECHNICAL BACKGROUND TO THIS APPLICATION

The disclosure of Japanese Patent Application No. 2010-107841 filed on May 10, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
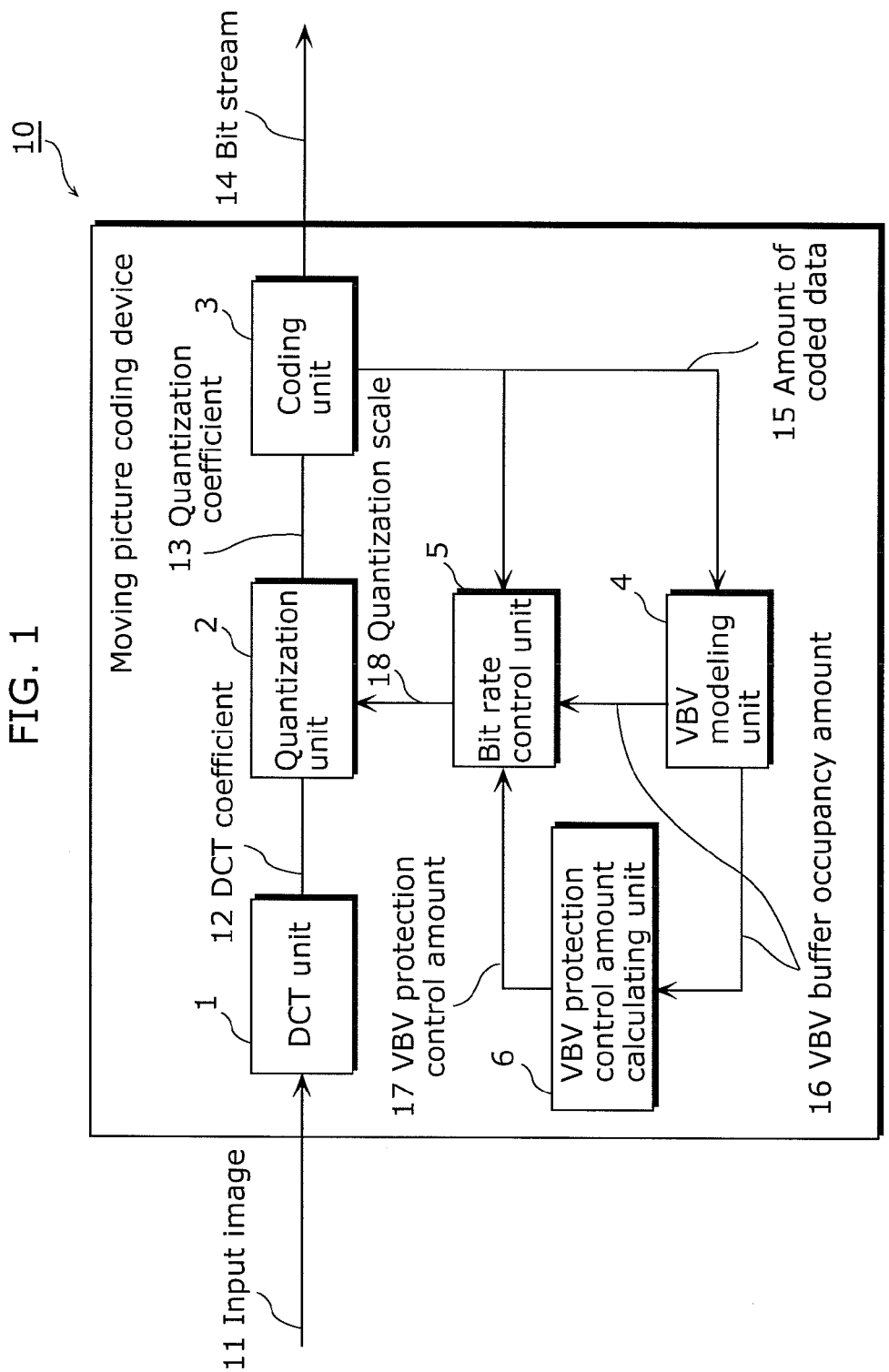
FIG. 1 is a block diagram showing a structure of a moving picture coding device according to Embodiment 1.

A moving picture coding device according to a first aspect of the present invention is a moving picture coding device which codes a moving picture, and includes a buffer modeling unit configured to simulate an occupancy amount of a coded data buffer at the time of decoding; and a bit rate control unit configured to determine a quantization width according to a rate of change of the occupancy amount of the coded data buffer.

The first aspect makes it possible to predict a failure of the coded data buffer based on the rate of change of the occupancy amount of the coded data buffer, and determine a desired quantization width according to the occupancy amount of the coded data buffer. With this, it is possible to prevent the coded buffer from failing without deteriorating subjective picture quality.

It is preferred that the moving picture coding device according to the first aspect of the present invention further includes a control amount calculating unit configured to calculate the rate of change of the occupancy amount of the coded data buffer, and calculate a first control amount for increasing the occupancy amount of the coded data buffer based on the rate of change, wherein the bit rate control unit is configured to determine the quantization width using the first control amount.

The first aspect allows the control amount calculating unit to calculate the rate of change of the occupancy amount of the coded data buffer, and to calculate the first control amount for increasing the occupancy amount of the coded data buffer based on the rate of change.

Moreover, in the moving picture coding device according to the first aspect of the present invention, it is preferred that, when the rate of change is less than 0, the control amount calculating unit is configured to calculate the first control amount so that the quantization width increases as an absolute value of the rate of change becomes larger.

According to the first aspect, when the rate of change is less than 0, that is, when the occupancy amount of the coded data buffer is on the decrease, the control amount calculating unit calculates the first control amount so that the quantization width increases as an absolute value of the rate of change becomes larger. With this, it is possible to avoid the buffer failure caused by buffer underflow.

Furthermore, in the moving picture coding device according to the first aspect of the present invention, it is preferred that the control amount calculating unit is configured to calculate the rate of change from accumulated occupancy amounts of the coded data buffer, using either a moving-average method or a least-square method.

The first aspect makes it possible to easily calculate the rate of change from the accumulated occupancy amounts of the coded data buffer, using either the moving-average method or the least-square method.

Moreover, in the moving picture coding device according to the first aspect of the present invention, it is preferred that the bit rate control unit is configured to calculate a second control amount for controlling an amount of coded picture data, and determine the quantization width using the first and second control amounts.

According to the first aspect, the quantization width is determined using not only the first control amount for controlling the occupancy amount of the coded data buffer but also the second control amount for controlling the amount of the coded picture data. With this, it is possible to prevent the coded data buffer from failing without suddenly changing picture quality.

Furthermore, in the moving picture coding device according to the first aspect of the present invention, it is preferred that the second control amount is a control amount for controlling an average amount of data that has been coded since a start of coding, and that the bit rate control unit is configured to determine the quantization width using a third control amount that is obtained by calculating, based on an occupancy rate indicating a ratio of the occupancy amount of the coded data buffer, a weighted average of the first and second control amounts.

According to the first aspect, the control amount for controlling the average amount of data that has been coded since the start of coding is used as the second control amount, and the quantization width is determined using the third control amount that is obtained by calculating, based on the occupancy rate indicating the ratio of the occupancy amount of the coded data buffer, the weighted average of the first and second control amounts. With this, it is possible to continuously control a dominant-subordinate relationship between average bit rate control and buffer control, based on the occupancy amount of the coded data buffer, and thus it is possible to avoid the buffer failure without suddenly changing the picture quality.

Moreover, in the moving picture coding device according to the first aspect of the present invention, it is preferred that a minimum margin is set in the occupancy amount of the coded data buffer.

The first aspect makes it possible to give flexibility to the buffer control, because the minimum margin is set in the occupancy amount of the coded data buffer.

A method for coding a moving picture according to a second aspect of the present invention is a method for coding a moving picture which includes: simulating an occupancy amount of a coded data buffer at the time of decoding; and determining a quantization width according to a rate of change of the occupancy amount of the coded data buffer.

The second aspect makes it possible to avoid a failure of the coded data buffer without deteriorating the subjective picture quality, because a desired quantization width can be determined by predicting the failure of the coded data buffer based on the rate of change of the occupancy amount of the coded data buffer.

A non-transitory computer-readable recording medium according to a third aspect of the present invention is a non-transitory computer-readable recording medium on which a moving picture coding program is recorded, the program causing a computer to execute: simulating an occupancy amount of a coded data buffer at the time of decoding; and determining a quantization width according to a rate of change of the occupancy amount of the coded data buffer.

As stated above, the present invention can be implemented as the non-transitory computer-readable recording medium on which the moving picture coding program is recorded.

The following describes embodiments of the present invention with reference to the drawings.

Embodiment 1

First, a structure of a moving picture coding device 10 according to Embodiment 1 is described with reference to FIG. 1. FIG. 1 is a block diagram showing the structure of the moving picture coding device according to Embodiment 1. It is to be noted that an input image is applied to a coding device which performs intra-picture (intra-frame) coding in the conventional MPEG-2 format in this present embodiment.

As shown in FIG. 1, the moving picture coding device 10 according to Embodiment 1 is a moving picture coding device which codes a moving picture based on a virtual buffer model at the time of decoding, and includes a DCT (Discrete Cosine Transform) unit 1, a quantization unit 2, a coding unit 3, a VBV modeling unit 4, a bit rate control unit 5, and a VBV protection control amount calculating unit 6.

The DCT unit 1 performs an orthogonal transformation on an input image (input signal) 11, and outputs, to the quantization unit 2, a DCT coefficient 12 as coefficient data. For instance, the DCT unit 1 receives moving picture data (picture) as the input image 11, and performs a DCT (discrete cosine transform) process on the input image 11 on the basis of a block of 8×8 pixels.

The quantization unit 2 quantizes the output data of the DCT unit 1, and outputs a quantization coefficient. In this embodiment, the quantization unit 2 quantizes the DCT coefficient 12 obtained from the DCT unit 1, based on a quantization scale 18 obtained from the bit rate control unit 5, and outputs a quantization coefficient 13 to the coding unit 3. An amount of coded data 15 can be decreased more by reducing an amount of information of the DCT coefficient 12 as the quantization scale 18 becomes larger.

The coding unit 3 performs a variable length coding process on the output data of the quantization unit 2, and outputs coded data. In this embodiment, the coding unit 3 performs source coding on the quantization coefficient 13 obtained from the quantization unit 2 and additional information such as the quantization scale 18, and outputs a bit stream 14.

The VBV modeling unit 4 is a virtual buffer modeling unit which simulates an occupancy amount of a coded data buffer at the time of decoding, and calculates a virtual coded data buffer. The VBV modeling unit 4 simulates an occupancy amount of a coded data buffer of a decoding device based on an amount of data coded by the coding unit 3 (amount of coded data 15). In this embodiment, the VBV modeling unit 4 simulates an occupancy amount of a VBV buffer (VBV buffer occupancy amount 16), which is a coded data buffer in the MPEG-2 format, and outputs the VBV buffer occupancy amount 16 obtained through the simulation, to the bit rate control unit 5 and the VBV protection control amount calculating unit 6.

The bit rate control unit 5 performs bit rate control by controlling a quantization width (quantization step) of the quantization unit 2, and determines the quantization width according to a rate of change of the occupancy amount of the coded data buffer. In this embodiment, the bit rate control unit 5 determines the quantization width using a first control amount (buffer protection control amount) for protecting the coded data buffer by increasing the occupancy amount of the coded data buffer, and outputs the determined quantization width to the quantization unit 2.

More specifically, the bit rate control unit 5 obtains, from the VBV protection control amount calculating unit 6, a VBV protection control amount 17 ($\Delta Rvbv$) as the first control amount, determines, as the quantization width, a quantization scale 18 based on the VBV protection control amount 17 ($\Delta Rvbv$) and a target amount of coded picture data R[i], and outputs the determined quantization scale 18 to the quantization unit 2.

Further, in this embodiment, the bit rate control unit 5 calculates, using an amount of picture data that has been coded, a second control amount for controlling an amount of picture data to be coded before the next operation, and determines the quantization scale 18 using the first and second control amounts.

More specifically, the bit rate control unit 5 calculates, for each picture, a control amount for an average amount of coded data (ΔRrate) (hereinafter, referred to as a control amount) for controlling an average amount of data that has been coded since a start of coding, as the second control amount. Then, the bit rate control unit 5 calculates a third control amount by calculating, based on a VBV buffer occupancy rate which indicates a ratio of the VBV buffer occupancy amount, a weighted average of the control amount (ΔRrate) and the VBV protection control amount (ΔRvbv) obtained from the VBV protection control amount calculating unit 6, updates the target amount of the coded picture data R[i] using the third control amount, and determines the quantization scale 18. Here, "i" in R[i] denotes a picture number.

The VBV protection control amount calculating unit 6 is a control amount calculating unit for calculating a rate of change of an occupancy amount of a coded data buffer as well as the first control amount (buffer protection control amount) based on the rate of change. In other words, the VBV protection control amount calculating unit 6 is a buffer protection control amount calculating unit which calculates a buffer protection control amount to be used for preventing the coded data buffer from failing at the time of decoding.

In this embodiment, the VBV protection control amount calculating unit 6 always monitors an operating state of the VBV modeling unit 4, predicts a failure of the VBV buffer based on the VBV buffer occupancy amount 16 calculated through the simulation and a rate of change (slope) of the VBV buffer occupancy amount 16, and calculates, as a control amount to be used for preventing the VBV buffer from failing, a VBV buffer occupancy amount 17 based on the prediction result.

More specifically, the VBV protection control amount calculating unit 6 accumulates VBV buffer occupancy amounts 16 obtained from the VBV modeling unit 4, and calculates a rate of change V of the VBV buffer occupancy amount 16 using the accumulated VBV buffer occupancy amounts 16.

Then, the VBV protection control amount calculating unit 6 predicts the number of pictures at which the VBV buffer fails, based on the rate of change of the VBV buffer occupancy amount 16, determines the VBV protection control amount 17 (ΔRvbv) as the first control amount for increasing the VBV buffer occupancy amount so that the buffer does not fail, and outputs the determined VBV protection control amount 17 to the bit rate control unit 5.

Here, the VBV protection control amount 17 (ΔRvbv) is a value equal to or less than 0, and has an effect of increasing (restoring) the occupancy amount of the VBV buffer by decreasing the target amount of the coded picture data R[i] more as the value becomes smaller (an absolute value becomes larger). It is to be noted that ΔRvbv=0 means that the target amount of the coded picture data is not controlled.

In this embodiment, when the rate of change V is equal to or less than 0, that is, when the occupancy amount of the coded data buffer is on the decrease, it is preferred that the VBV protection control amount 17 (ΔRvbv) such that the quantization scale 18 increases as the absolute value of the rate of change V becomes larger is calculated. This allows the VBV buffer occupancy amount 16 to increase, and thus the buffer underflow can be avoided.

Furthermore, in order to reduce a discontinuous difference in picture quality between pictures as much as possible, it is preferred that a difference in absolute value of the VBV protection control amount 17 (ΔRvbv) in each of continuous pictures is reduced as much as possible. To put it differently, when the number of pictures from the present time to a time when the VBV buffer is to fail is predicted, although it is possible to differ the VBV protection control amount 17 (ΔRvbv) in each of pictures included in the number of pictures until the VBV buffer fails, from one another, it is preferred that the VBV protection control amounts 17 are made equal.

Figure 2:
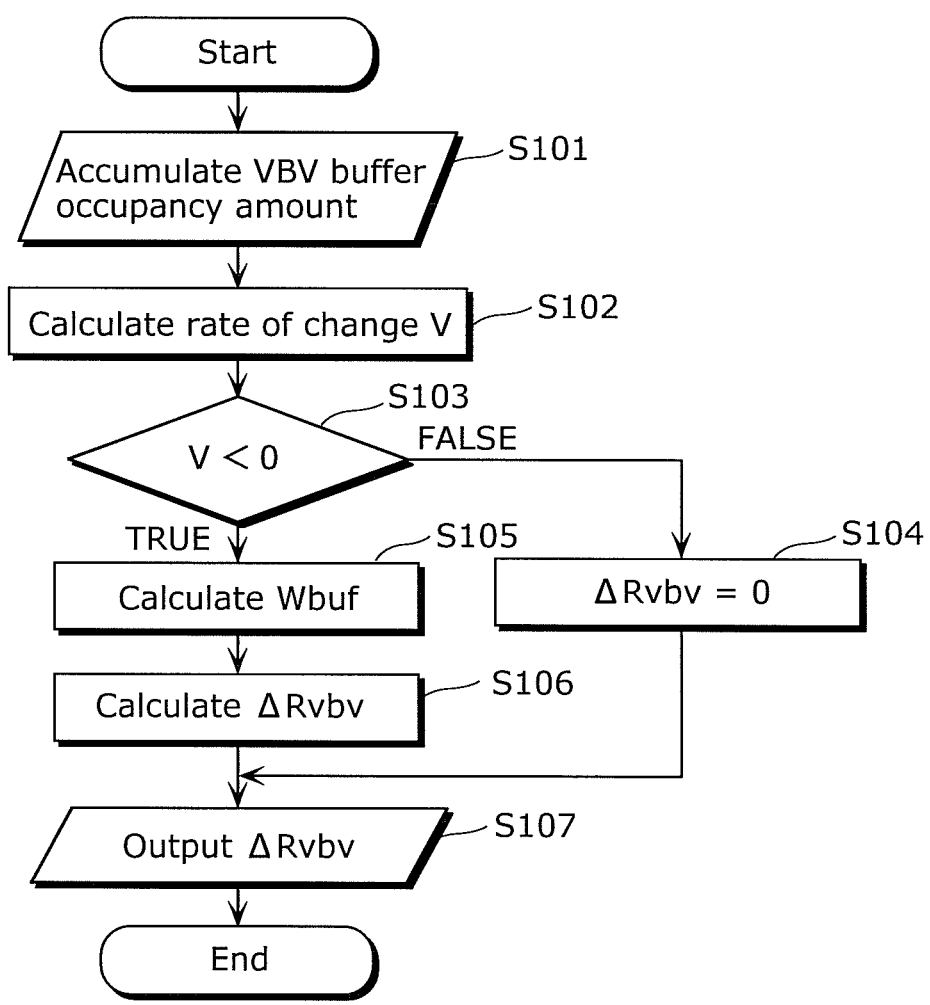
FIG. 2 is a flowchart in a control amount calculation step for calculating a VBV protection control amount in Embodiment 1.
Figure 3:
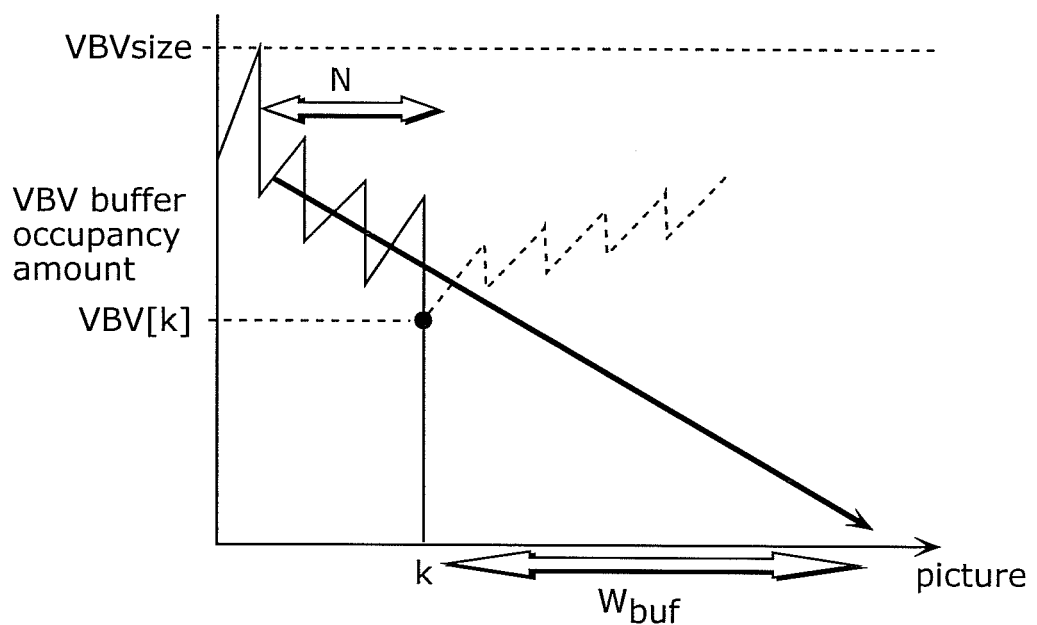
FIG. 3 is a diagram showing a change of an occupancy amount of a coded data buffer and a control section in Embodiment 1.

The following describes, using FIGS. 2 and 3, a moving picture coding method according to Embodiment 1 with reference to FIG. 1. FIG. 2 is a flowchart in a control amount calculation step for calculating a VBV protection control amount (first control amount) in Embodiment 1, and shows an operation of the VBV protection control amount calculating unit 6. FIG. 3 is a diagram showing a change of an occupancy amount (VBV buffer occupancy amount) of a coded data buffer and a control section in Embodiment 1.

First, in the DCT unit 1, the orthogonal transformation is performed on the input image 11, and the DCT coefficient 12 is outputted to the quantization unit 2. Next, in the quantization unit 2, the DCT coefficient 12 is quantized based on the quantization scale 18 obtained from the bit rate control unit 5, and the quantization coefficient 13 is outputted to the coding unit 3. Next, in the coding unit 3, the quantization coefficient 13 is coded, and the bit stream 14 is outputted.

Subsequently, the VBV buffer occupancy amount 16 at the time of decoding is calculated through simulation in the VBV modeling unit 4, based on the amount of data coded by the coding unit 3 (amount of coded data 15) (a buffer modeling step). The VBV buffer occupancy amount 16 calculated through the simulation is outputted to the VBV protection control amount calculating unit 6.

Next, the VBV protection control amount 17 (ΔRvbv), which is the first control amount for increasing the occupancy amount of the coded data buffer, is calculated in the VBV protection control amount calculating unit 6 (a control amount calculation step).

More specifically, first, as shown in FIG. 3, a picture number and VBV buffer occupancy amounts 16 received from the VBV modeling unit 4 are accumulated in the VBV protection control amount calculating unit 6 (S101). It is to be noted that the VBV buffer occupancy amount 16 is stored in, for instance, a storage unit of the VBV protection control amount calculating unit 6.

Here, in FIG. 3, the horizontal axis indicates a picture number (time), and indicates that the picture number increases and the time passes as a point on the axis moves to the right. Moreover, in FIG. 3, the vertical axis indicates a VBV buffer occupancy amount, and indicates that when the VBV buffer occupancy amount exceeds VBVsize which is the maximum value of the VBV buffer occupancy amount, an overflow is caused, and when the VBV buffer occupancy amount falls below 0, an underflow is caused.

FIG. 3 also shows a VBV buffer occupancy amount when the picture number is k, and a history from a start of coding to a time of coding when the picture number is k. Further, in FIG. 3, a period in which the VBV buffer occupancy amount is increasing (an upward-sloping solid line portion) indicates a period in which a bit stream is being provided from a transmission channel or the like, and is a constant period defined by a standard. Moreover, a period in which the VBV buffer occupancy amount is decreasing (a vertical solid line portion) indicates that one picture is decoded, and the vertical length thereof indicates an amount of a bit stream extracted from a buffer of a decoding device. In other words, the larger an amount of coded data per picture is, the larger the amount of the bit stream extracted from the buffer of the decoding device is, and the smaller the VBV buffer occupancy amount is.

Subsequently, as shown in FIG. 3, in the VBV protection control amount calculating unit 6, a rate of change V of a VBV buffer occupancy amount accumulated in, for example, a section of N pictures is determined based on the accumulated VBV buffer occupancy amount (S102).

It is to be noted that N indicates the number of pictures, and can be defined as in Equation 1 below using, for instance, the maximum value of the VBV buffer VBVsize and a target amount of coded data per picture Bit_Per_Picture.

[Math. 1]

$$N = \text{floor}(VBVsize/Bit\_Per\_Picture) \quad \text{(Equation 1)}$$

Here, in Equation 1, floor (x) is a floor function that gives the largest integer number which is equal to or less than a real number x.

Next, the rate of change V of the VBV buffer occupancy amount is determined using N calculated in Equation 1. The rate of change V is calculated based on the accumulated VBV buffer occupancy amounts in a manner such that a comprehensive change of a VBV buffer occupancy amount with respect to a coded picture is understood. Such a rate of change V can be calculated using, for example, the moving-average method and the least-square method. For instance, in the case of the least-square method approximated to the linear equation, a constant of proportion can be the rate of change V.

In this embodiment, the rate of change V is defined as in Equation 2 below. Here, in Equation 2, k denotes a picture number of a most recently coded picture, and VBV[j] denotes a VBV buffer occupancy amount at a picture number j.

[Math. 2]

$$V = \frac{N \sum_{j=k-N+1}^{k} j \times VBV[j] - \sum_{j=k-N+1}^{k} j \times \sum_{j=k-N+1}^{k} VBV[j]}{N \sum_{j=k-N+1}^{k} j^2 - \left(\sum_{j=k-N+1}^{k} j\right)^2} \quad \text{(Equation 2)}$$

Next, in the VBV protection control amount calculating unit 6, a magnitude of the rate of change V is assessed (S103). More specifically, it is assessed whether the rate of change V is equal to or more than 0 or less than 0.

Here, when the rate of change V is equal to or more than 0, it indicates a state (V=0) where the VBV buffer occupancy amount has not changed over N pictures or a state (V>0) where the VBV buffer occupancy amount is increasing. Consequently, the buffer underflow is not caused when the rate of change V is equal to or more than 0 (FALSE in S103), and thus the VBV protection control amount 17 (ΔRvbv)=0 (S104).

In contrast, when the rate of change V is less than 0 (TRUE in S103), it indicates a state where the VBV buffer occupancy amount has been decreasing. Here, under the assumption that coding characteristics of an input image do not change significantly, as shown in FIG. 3, in the VBV protection control amount calculating unit 6, the number of pictures Wbuf, with reference to the picture number k, at which the underflow is caused is calculated using Equation 3 below (S105).

[Math. 3]

$$Wbuf = \text{floor}(-VBV[k]/V) \quad \text{(Equation 3)}$$

Subsequently, in the VBV protection control amount calculating unit 6, the VBV protection control amount 17 (ΔRvbv) is calculated as the first control amount for increasing the occupancy amount of the coded data buffer (S106).

In this embodiment, the VBV protection control amount 17 (ΔRvbv) is defined, as in Equation 4 below, as a correction amount for changing the VBV buffer occupancy amount from a decreasing tendency to an increasing tendency during a period in which the number of pictures reaches the number of pictures Wbuf with reference to a picture to be coded. In other words, the VBV protection control amount 17 (ΔRvbv) indicates a control amount for restoring the VBV buffer per picture in a period of Wbuf so that the buffer underflow is avoided.

[Math. 4]

$$\Delta Rvbv = -(VBVsize - VBV[k]/Wbuf) \quad \text{(Equation 4)}$$

Next, in the VBV protection control amount calculating unit 6, the calculated VBV protection control amount 17 (ΔRvbv) is outputted, for each picture, to the bit rate control unit 5 (S107).

In the above manner, the VBV protection control amount 17 (ΔRvbv) is calculated and outputted.

Subsequently, in the bit rate control unit 5, the quantization scale 18 is determined using the VBV protection control amount 17 (ΔRvbv), which is the first control amount (bit rate control step).

More specifically, first, in the bit rate control unit 5, the control amount (ΔRrate), which is the second control amount, is calculated for each picture, using Equation 5 below. The control amount (ΔRrate) indicates a control amount for approximating the target amount of the coded data to an average bit rate.

Here, in Equation 5, Wrate denotes the number of pictures at which the average bit rate is calculated, and S[j] denotes an amount of coded picture data at a picture number j. It is to be noted that Wrate may be an arbitrary value and may be set according to, for instance, a desired time constant, and that the larger Wrate is, the more gradually an amount of coded data is controlled.

[Math. 5]

$$\Delta Rrate = \frac{\sum_{j=1}^{Wrate} (R[j] - S[j])}{Wrate} \quad \text{(Equation 5)}$$

Next, in the bit rate control unit 5, the target amount of the coded picture data R[i] is updated using two types of control amounts, that is, the VBV protection control amount 17 (ΔRvbv) and the control amount (ΔRrate).

More specifically, as shown in Equation 6 below, in the bit rate control unit 5, the target amount of the coded picture data R[i] is calculated as the third control amount by calculating, based on a ratio according to the VBV buffer occupancy rate, a weighted average of the VBV protection control amount 17 (ΔRvbv) and the control amount (ΔRrate) and by adding the weighted average to an immediately previous target amount of coded picture data R[i−1]. It is to be noted that R[0] which is an initial value of R[i] may be an arbitrary value, and may be, for instance, an amount of coded data per picture which is obtained by dividing the average bit rate by the number of pictures per second. Here, the VBV buffer occupancy rate is a ratio of a VBV buffer occupancy amount VBV[k] to VBVsize which is the maximum value of the VBV buffer occupancy amount.

[Math. 6]

$$R[i] = R[i-1] + \left(1 - \frac{VBV[k]}{VBVsize}\right) \times \Delta Rvbv + \frac{VBV[k]}{VBVsize} \times \Delta Rrate \quad \text{(Equation 6)}$$

As stated above, calculating the weighted average using the ratio according to the VBV buffer occupancy rate makes it possible to control the control amount (ΔRrate) more preferentially than the VBV protection control amount (ΔRvbv) when the VBV buffer occupancy amount is large, and to control the VBV protection control amount (ΔRvbv) more preferentially than the control amount (ΔRrate) when the VBV buffer occupancy amount is small and it is necessary to avoid the buffer underflow.

Accordingly, it is possible to continuously control a dominant-subordinate relationship between average bit rate control and buffer control, based on the VBV buffer occupancy amount, and thus it is possible to calculate the target amount of the coded picture data R[i] without suddenly changing the VBV buffer occupancy amount. This makes it possible to suppress a sudden change of an average bit rate or a quantization scale, and thus it is possible to prevent the buffer from failing without suddenly changing the picture quality.

It is to be noted that as in variable bit rate (VBR) control, the above-mentioned method is particularly effective in a format in which the control amount (ΔRrate) tends to conflict with the VBV protection control amount (ΔRvbv).

In this embodiment, as described in Patent Reference 1, the quantization scale 18 (Q) is determined using Equation 7 below, based on X defined as a parameter called "global complexity", and the determined quantization scale 18 (Q) is outputted to the quantization unit 2.

[Math. 7]

$$Q = X/R[i] \quad \text{(Equation 7)}$$

Here, in Equation 7, i denotes a picture number of a picture to be coded, and X is defined by a product between an amount of previously coded picture data S and a quantization scale Q thereof (X=Q×S).

In the above manner, the quantization scale 18 is determined using the VBV protection control amount 17 (ΔRvbv).

As described above, the moving picture coding device and the moving picture coding method according to Embodiment 1 make it possible to determine, using the rate of change of the coded buffer occupancy amount (VBV buffer occupancy amount), the quantization scale so that the buffer failure is avoided by predicting the number of pictures at which the underflow is caused. Here, in this embodiment, the first control amount (VBV protection control amount) which is sufficient to avoid the buffer failure is calculated, and the quantization scale is determined using the first control amount. With this, it is possible to prevent the coded buffer from failing without deteriorating the subjective picture quality.

Furthermore, in this embodiment, it is possible to predict the buffer failure, and thus it is possible to calculate, according to the number of pictures from the present time to a time when the buffer is to fail, first control amounts (VBV protection control amounts) so that the quantization scale 18 gradually changes. With this, it is possible to perform coding with superior subjective picture quality by suppressing occurrence of a difference in picture quality between pictures and continuously changing picture quality between the pictures. For instance, the VBV protection control amount (ΔRvbv) can be calculated as much as the number of pictures from the present time to the time when the buffer is to fail.

Moreover, in this embodiment, the quantization scale is determined by calculating the third control amount, which is the weighted average of the first control amount and the second control amount for controlling an average amount of coded data according to the VBV buffer occupancy amount, and thus it is possible to suppress the sudden change of the quantization scale in a time direction. With this, it is possible to continuously control the dominant-subordinate relationship between the average bit rate control and the buffer control, based on the VBV buffer occupancy amount, and thus it is possible to prevent the coded buffer from failing without suddenly changing the picture quality. Accordingly, the present invention realizes the moving picture coding device capable of stably maintaining the subjective picture quality.

It is to be noted that in this embodiment, the number of pictures for use in the accumulation by the coded buffer (VBV buffer) may be equal to or more than the above-mentioned number of pictures N, and a storage region may be managed using a ring buffer. Furthermore, although it is possible to better understand short-term change of the coded buffer as the number of pictures N becomes smaller, reducing the number of pictures N too much causes the VBV protection control amount (ΔRvbv) to change in the short term, which results in a case where the image quality is not stable. Accordingly, as shown in Equation 1, it is desirable to set, to the number of pictures N, a value close to a length converted from a total amount of the coded buffer.

Moreover, although an intra-coded picture has been described in this embodiment, the embodiment is not limited to the intra-coded picture. The embodiment is also applicable to an inter-coded picture for which motion compensation is used. In particular, when an I picture, a P picture, and a B picture cyclically appear, that is, in the case of a GOP (Group Of Picture) structure, it is effective to increase the number of pictures N to 1 GOP or more. Furthermore, the embodiment is not limited to the MPEG-2 format, and is applicable to other coding formats represented by MPEG-4AVC or H.264 in which a coded data buffer is used.

Embodiment 2

Figure 4:
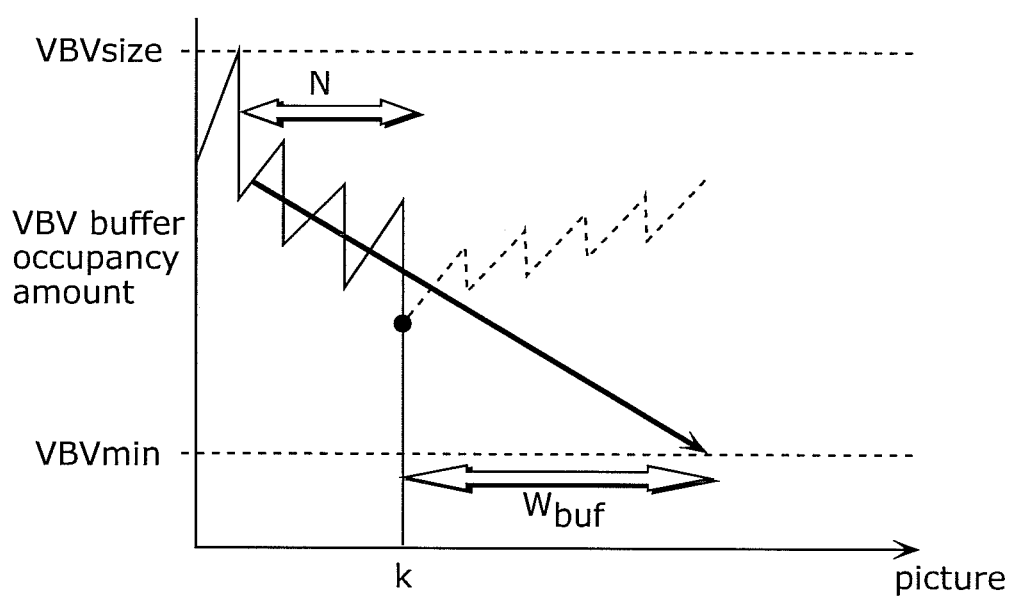
FIG. 4 is a diagram showing a change of an occupancy amount of a coded data buffer and a control section in Embodiment 2.
Figure 5:
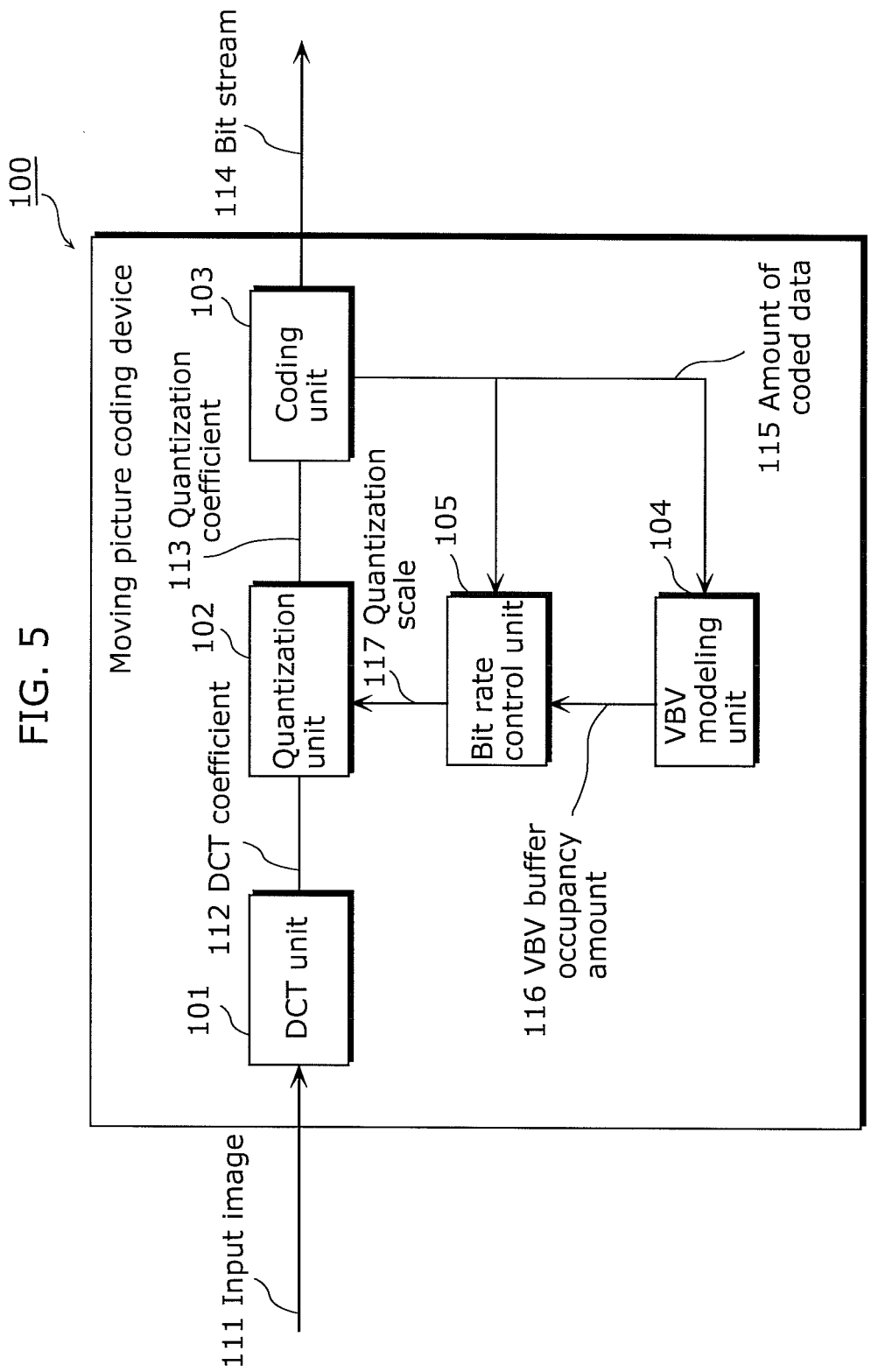
FIG. 5 is a block diagram showing a structure of a conventional moving picture coding device.

The following describes Embodiment 2 with reference to FIG. 4. FIG. 4 is a diagram showing a change of an occupancy amount of a coded data buffer and a control section in Embodiment 2. It is to be noted that elements of a moving picture coding device according to Embodiment 2 are the same as the elements of the moving picture coding device 10 according to Embodiment 1 shown in FIG. 1, and thus description thereof is omitted.

The moving picture coding device according to Embodiment 2 differs from the moving picture coding device 10 according to Embodiment 1 in that the minimum margin (lower limit) is set in the occupancy amount of the coded data buffer (VBV buffer occupancy amount). In other words, in this embodiment, when the VBV protection control amount (ΔRvbv) is calculated, the minimum margin is set in the VBV buffer occupancy amount. For example, as shown in FIG. 4, when the minimum margin (VBVmin) is set in the VBV buffer occupancy amount, Equation 4 above can be represented as Equation 8 below, which allows the VBV protection control amount (ΔRvbv) to be calculated.

[Math. 8]

$$\Delta Rvbv = -(VBVsize) - VBVmin - VBV[i]/Wbuf) \quad \text{(Equation 8)}$$

It is to be noted that the moving picture coding method according to this embodiment is the same as the moving picture coding method according to Embodiment 1.

As described above, the moving picture coding device and the moving picture coding method according to Embodiment 2 can give flexibility to the buffer control, because the minimum margin is set in the VBV buffer occupancy amount. With this, it is possible to address even a case where the assumption at the time of calculating the number of pictures Wbuf, which is described in Embodiment 1, does not hold, such as an input image in which a pattern significantly changes between pictures at the time of scene change or captured with flash on.

Although the moving picture coding device and the moving picture coding method according to the present invention have been described based on the embodiments, the present invention is not limited to the embodiments.

For instance, the moving picture coding method according to the embodiments can be implemented as a computer program which causes a computer to execute the method. The computer program relating to the moving picture coding method may be recorded on a non-transitory computer-readable recording medium. Examples of the recording medium include a magnetic disk, an optical disk, a magneto-optical disk, an IC card, a semiconductor memory, and so on. Further examples thereof include a flexible disk, a hard disk, a CD-ROM, a DVD, a DVD-ROM, a DVD-RAM, and BD (Blu-Ray Disc™).

Furthermore, various embodiments can provide the functions of the moving picture coding device according to the embodiments. For example, the moving picture coding device may be implemented as hardware such as an LSI or a program in the computer.

Those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The moving picture coding device and the moving picture coding method according to the present invention are widely applicable to video recording apparatuses represented by camcorders or video recorders, or video relay apparatuses. Alternatively, the moving picture coding device and the moving picture coding method according to the present invention are applicable to coding programs in computers or the like.

What is claimed is:

1. A moving picture coding device which codes a moving picture, said moving picture coding device comprising:
   a buffer modeling unit configured to simulate an occupancy amount of a coded data buffer at a time of decoding;
   a control amount calculating unit configured to (i) calculate a rate of change of the occupancy amount of the coded data buffer, (ii) when the calculated rate of change is less than zero, predict, using the calculated rate of change, a number of pictures until an underflow of the coded data buffer is caused, and calculate a first control amount for protecting the coded data buffer, so as to avoid the underflow by increasing the occupancy amount of the coded data buffer until a number of pictures exceeds the predicted number of pictures, and (iii) when the calculated rate of change is more than or equal to zero, set the calculated first control amount to zero; and
   a bit rate control unit configured to (i) calculate a target amount of coded picture data using the calculated first control amount and (ii) determine a quantization width using the calculated target amount of coded picture data,
   wherein the calculated target amount of coded picture data is changed when the calculated rate of change is less than zero, and the calculated target amount of coded picture data is not changed when the calculated rate of change is more than or equal to zero, and
   wherein the predicted number of pictures until the underflow of the coded data buffer is obtained by dividing the occupancy amount of the coded data buffer at a time of coding the most recently coded picture by the calculated rate of change of the occupancy amount of the coded data buffer.

2. The moving picture coding device according to claim 1, wherein, when the calculated rate of change is less than zero, said control amount calculating unit is configured to calculate the first control amount so that the quantization width increases as an absolute value of the rate of change becomes larger.

3. The moving picture coding device according to claim 1, wherein said control amount calculating unit is configured to calculate the rate of change from accumulated occupancy amounts of the coded data buffer, using either a moving-average method or a least-square method.

4. The moving picture coding device according to claim 1, wherein said bit rate control unit is configured to calculate a second control amount for controlling an amount of coded picture data, and to determine the quantization width using the first and second control amounts.

5. The moving picture coding device according to claim 4,
   wherein the second control amount is a control amount for controlling an average amount of data that has been coded since a start of coding, and
   said bit rate control unit is configured to determine the quantization width using a third control amount that is obtained by calculating, based on an occupancy rate indicating a ratio of the occupancy amount of the coded data buffer, a weighted average of the first and second control amounts.

6. The moving picture coding device according to claim 1, wherein a minimum margin is set in the occupancy amount of the coded data buffer.

* * * * *